(12) United States Patent
Lu et al.

(10) Patent No.: US 8,331,037 B2
(45) Date of Patent: *Dec. 11, 2012

(54) OPTICAL LENS

(75) Inventors: Mu-Yin Lu, Chung-Ho (TW); Hung-Hsun Chou, Chung-Ho (TW)

(73) Assignee: Edison Opto Corporation, New Taipei (TW)

( * ) Notice: Subject to any disclaimer, the term of this patent is extended or adjusted under 35 U.S.C. 154(b) by 236 days.

This patent is subject to a terminal disclaimer.

(21) Appl. No.: 12/871,210

(22) Filed: Aug. 30, 2010

(65) Prior Publication Data

US 2012/0050889 A1    Mar. 1, 2012

(51) Int. Cl.
*G02B 3/10* (2006.01)
*G02B 13/18* (2006.01)

(52) U.S. Cl. ........ 359/721; 359/642; 359/718; 359/741; 359/800; 362/235

(58) Field of Classification Search .................. 359/642, 359/718, 721, 725, 741, 796, 798–800, 809, 359/810

See application file for complete search history.

(56) References Cited

U.S. PATENT DOCUMENTS

| | | | | |
|---|---|---|---|---|
| 3,760,237 A | * | 9/1973 | Jaffe | 257/98 |
| 2006/0138437 A1 | * | 6/2006 | Huang et al. | 257/98 |
| 2007/0029563 A1 | * | 2/2007 | Amano et al. | 257/98 |
| 2010/0128489 A1 | * | 5/2010 | Holder et al. | 362/329 |
| 2010/0172140 A1 | * | 7/2010 | Chen et al. | 362/311.02 |
| 2011/0228528 A1 | * | 9/2011 | Yang et al. | 362/235 |

* cited by examiner

*Primary Examiner* — Jordan Schwartz
(74) *Attorney, Agent, or Firm* — Chun-Ming Shih; HDLS IPR Services

(57) ABSTRACT

An optical lens includes a main body having an outer convex surface and a bottom surface opposite to the outer convex surface. The bottom surface has an inner concave surface which is concave toward the outer convex surface. The outer convex surface and the inner concave surface cooperatively form two positive lens portions and a negative lens portion. The positive lens portions and the negative lens portion are arranged in a triangular configuration.

3 Claims, 6 Drawing Sheets

US 8,331,037 B2

OPTICAL LENS

BACKGROUND OF THE INVENTION

1. Field of the Invention

The present invention relates to an optical lens. More particularly, the present invention relates to an optical lens capable of forming a desired distribution of illumination intensity.

2. Description of Related Art

Having the advantage of saving energy, light emitting diodes (LEDs) are gradually replacing the traditional lamp bulbs and used as the next generation light sources for general lighting applications, which include indoor and outdoor lightings. However, in practical use, since the dimensions of a single LED chip are extremely small, the light intensity can be quite high within an adjacent small area around the LED chip. That may cause discomfort to the human eye when directly viewing the LED chip.

Therefore, in practical applications, at least one optical element is often provided onto the LED chip for improving the uniform illumination and solving the above-mentioned problem of ultra-high light intensity area around the LED chip. In some particular applications, the optical element can further be designed in shape and size to adjust the distribution of illuminating intensity.

As to the applications of street lamps, the light emitted from street lamps illuminate road surfaces at night for vehicle drivers to have clear sights and ensure the driving safety. Therefore, the street lamps are often required to provide a better uniformity of the illumination distribution on the roads. The street lamps are usually arranged at intervals along the roadside and each of them has a lamp post standing on the ground and a lamp holder at the top end of the lamp post. The lamp holder should be set inclined upwardly in order to illuminate toward the middle of the road for providing better uniformity of the illumination distribution. However, such a configuration may lead to a negative influence. The upwardly inclined lamp holder may increase the possibility that the light source in the lamp holder may be directly viewed by the human eye thus cause discomfort and blurred vision. And the above-mentioned situation will be worse when the LEDs are used as light sources in the street lamps, since the light intensity around the LED chip is higher than other conventional light sources.

SUMMARY OF THE INVENTION

The object of the present invention is to provide an optical lens, capable of redirecting the direction of illumination without using an inclined mechanism to achieve uniform illumination. In another aspect, light can be prevented from directly irradiating into the human eye, and the discomfort and blurred vision can be avoided.

Therefore, the present invention provides an optical lens including a main body, which has an outer convex surface and a bottom surface opposite to the outer convex surface. The bottom surface has an inner concave surface which is concave toward the outer convex surface. The outer convex surface and the inner concave surface cooperatively form two positive lens portions and a negative lens portion. The positive lens portions and the negative lens portion are arranged in a triangular configuration.

DETAILED DESCRIPTION OF THE INVENTION

The present invention is described below in detailed with the reference to accompanying drawings.

Figure 1:
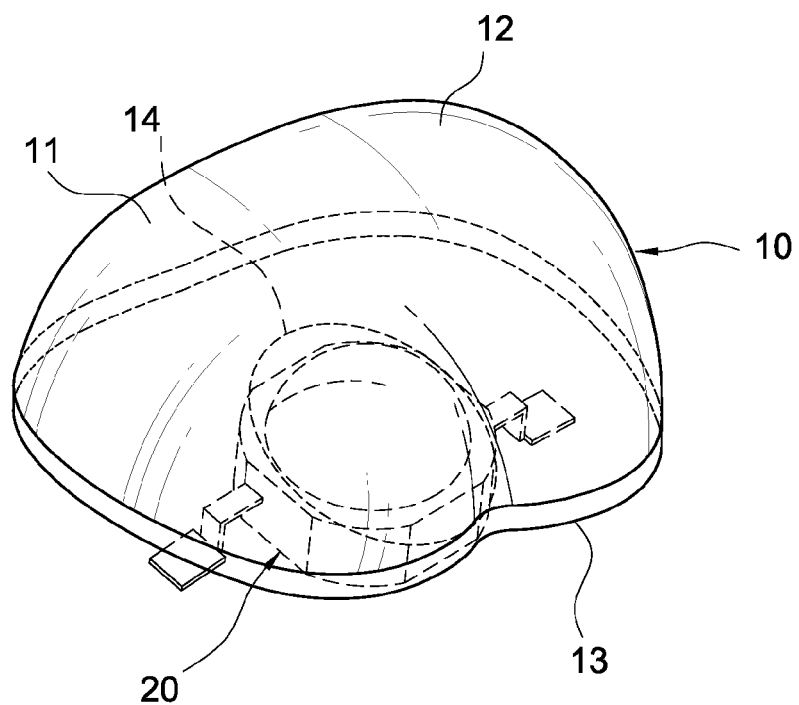
FIG. 1 is a schematic view of the optical lens of the present invention.

FIG. 1 shows a schematic view of the optical lens 10 according to an embodiment of the present invention. The optical lens 10 is arranged on a light emitting diode (LED) 20 for adjusting the illumination intensity distribution of the LED 20. The LED 20 is a surface mount device (SMD) type LED, but not limited thereto in practical use. The optical lens 10 includes a transparent main body 11, which may be made of glass, plastic or other transparent material. The main body 11 has an outer convex surface 12 and a bottom surface 13 opposite to the outer convex surface 12. The bottom surface 13 is designed to be a flat plane, such that the bottom surface 13 can increase the amount of total reflection. Therefore, the bottom surface 13 can decrease the amount of light extracting therefrom and increase the amount of the upwardly reflected light and then can increase the light extraction from the outer convex surface 12. The middle of the bottom surface 13 has an inner concave surface 14, which is concave toward the outer convex surface 12.

Figure 2:
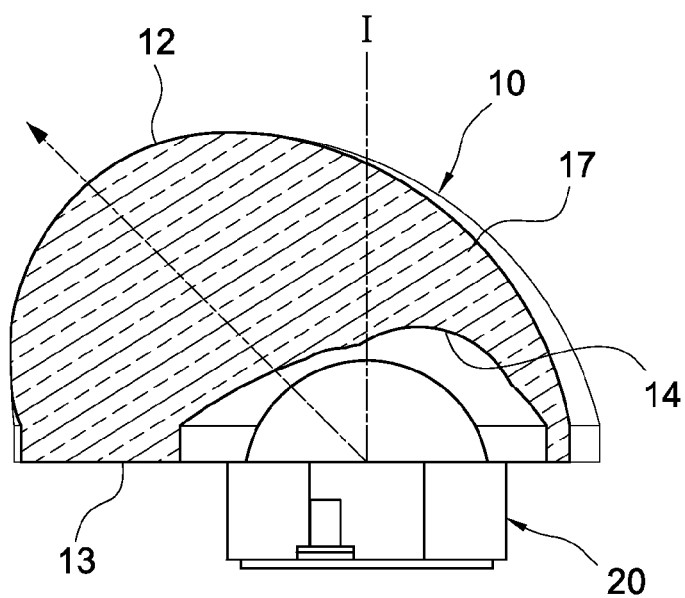
FIG. 2 shows the sectional view of the optical lens of the present invention.
Figure 4:
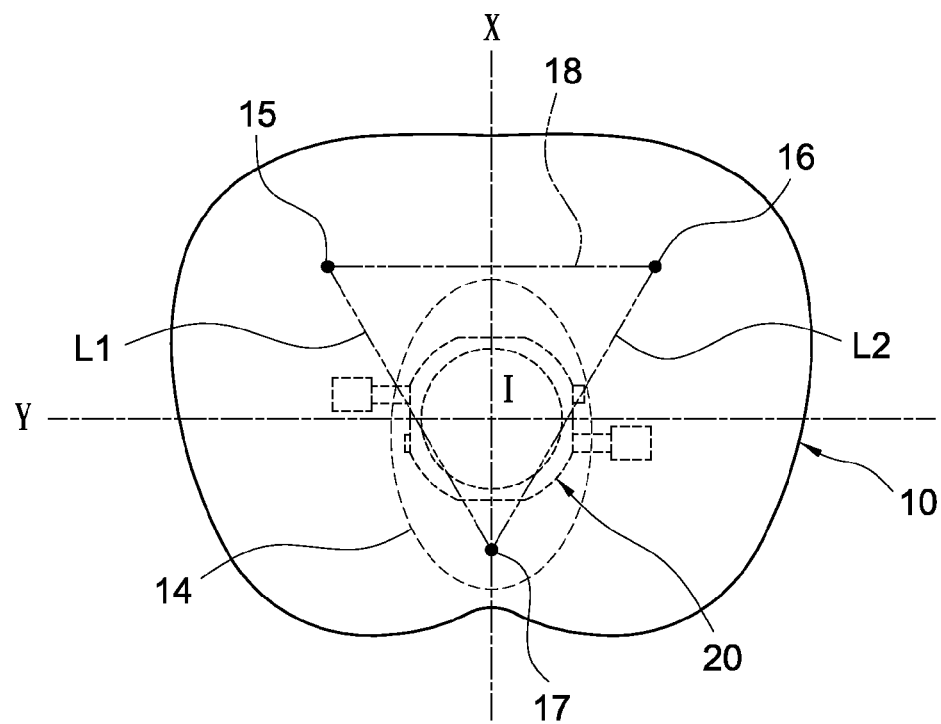
FIG. 4 shows the top view of the optical lens of the present invention.

FIG. 2 shows the cross-sectional view of the optical lens 10 along the first axis X shown in FIG. 4. An optical axis I of the LED 20 coincides with the cross section plane of the optical lens 10. In the right portion of the main body 11, the outer convex surface 12 and the inner concave surface 14 cooperatively form a negative lens portion 17. At the negative lens portion 17, the curvature of the outer convex surface 12 thereof is smaller than the curvature of the inner concave surface 14 thereof. Therefore, light can be diverged when the light passes through the negative lens portion 17. Thus, a part of the light emitted from the LED 20 can be diverged by the negative lens portion 17 and can not be used for illuminating road surface or other objects.

As to the left portion of the main body 11 in FIG. 2, the curvature of the outer convex surface 12 thereof is larger than the curvature of the inner concave surface 14 thereof, which can converge light emitted from the LED 20. Thus, a part of the light emitted from the LED 20 can be converged by the left portion of the main body 11 and can be used for illuminating road surface or other objects.

As also can be seen in FIG. 2, the portion having the largest curvature of the outer convex surface 12 is away from the portion having largest curvature of the concave surface 14. Besides, the largest curvature of the outer convex surface 12 is larger than the curvature of the portion of the inner concave surface 14 which is adjacent to the portion having the largest curvature of the outer convex surface 12. The largest curvature of the inner concave surface 14 is larger than the curvature of the portion of the outer convex surface 12 which is adjacent to the portion having the largest curvature of the inner concave surface 14.

Figure 3:
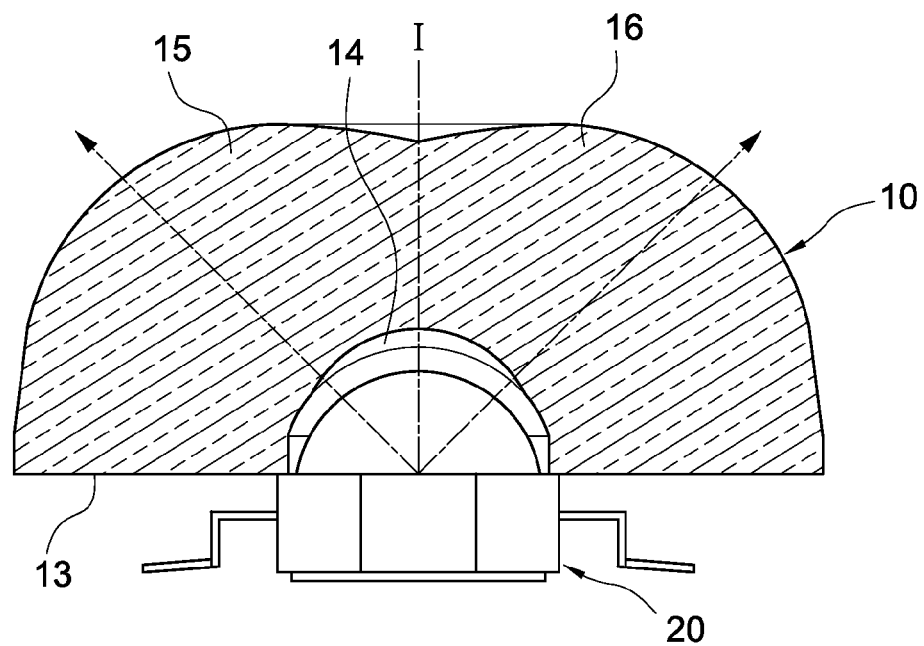
FIG. 3 shows another sectional view for the optical lens of the present invention.

FIG. 3 shows the cross-sectional view of the optical lens 10 along the second axis Y shown in the FIG. 4. The optical axis I of the LED 20 also coincides with this cross section plane of the optical lens 10. The second axis Y is perpendicular to the first axis X. The portion of the main body 11 in this cross-sectional view is just the left portion of the optical lens 10 shown in FIG. 2, which can converge light emitted from the LED 20. As shown in FIG. 4, two adjacent positive lens portions 15, 16 are formed by the outer convex surface 12 and the inner concave surface 14. More particularly, in each of these two positive lens portions 15, 16, the curvature of the outer convex surface 12 thereof is larger than the curvature of the inner concave surface 14 thereof. Therefore, light can be converged when the light passes through the positive lens portions 15, 16. Thus, a part of the light emitted from the LED 20 can be converged by the positive lens portions 15, 16 and can be used for illuminating road surface or other objects.

FIG. 4 shows a top view of the optical lens 10 of the present invention. The negative lens portion 17 and the positive lens portions 15, 16 are arranged in a triangular configuration (indicated by the triangle 18). The LED 20 is located inside the triangle 18. In a preferred embodiment, the distances L1, L2 between the negative lens portion 17 and each of the positive lens portions 15, 16 are equal. However, in the practical application, the distances can be adjusted to unequal based on the different situations.

Figure 5:
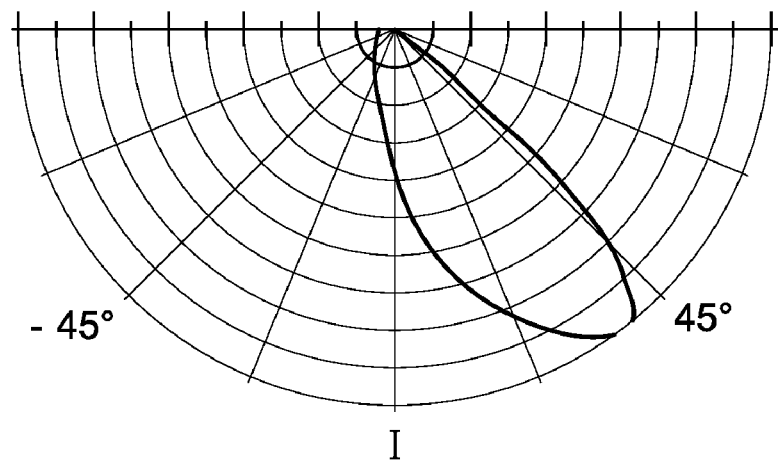
FIG. 5 is a schematic view of the illumination intensity distribution of the optical lens of the present invention.

FIG. 5 is a schematic view of the illumination intensity distribution along the first axis X of the optical lens 10 according to the present invention. Please refer to FIG. 2 and FIG. 5, the light emitted from the LED 20 converges in a direction (indicated by arrow) inclined to the left side of the optical axis I by about 40 degrees. In the practical situation, the degrees may be within the range between 10 and 60 degrees.

Figure 6:
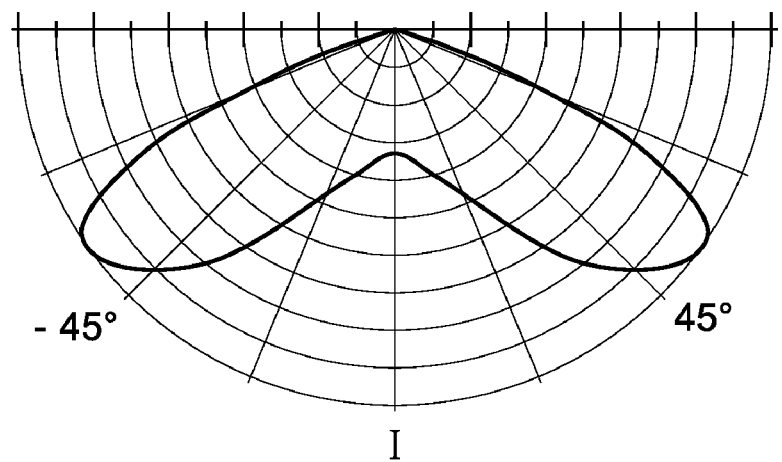
FIG. 6 is a schematic view of the illumination intensity distribution of the optical lens of the present invention.

FIG. 6 is a schematic view of the illumination intensity distribution along the second axis Y of the optical lens 10 of the present invention. Please refer to FIG. 3 and FIG. 6, the light emitted from the LED 20 converges in two different inclined directions (indicated by arrow), which are symmetric and each inclining 70 degrees to the optical axis I. In the practical situation, the degrees may be within the range between 50 and 80 degrees.

Figure 7:
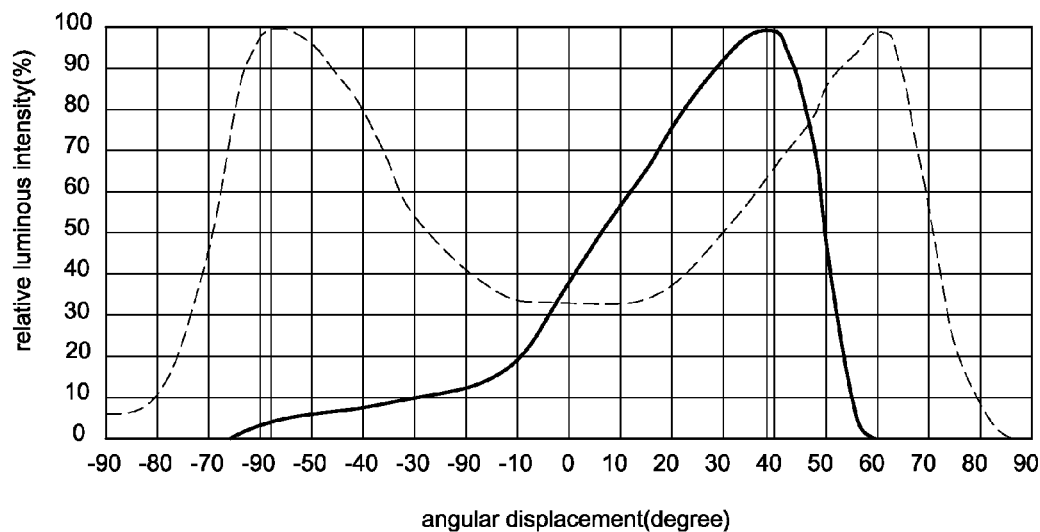
FIG. 7 is a graph of the illumination intensity distribution of the optical lens of the present invention.

FIG. 7 is a graph of the relative illumination intensity for the angular displacement of the optical lens of the present invention. The solid line shows the relative illumination intensity distribution along the first axis X, and the dashed line shows the relative illumination intensity distribution along the second axis Y. As the solid line shows, the relative illumination intensity is above 30 percent within the range between 0 degree and +50 degrees, which means light is converged within the range between the 0 degree and +50 degrees. As the dished line shows, the relative illumination intensity is at least 30 percent in the range between −70 degrees to +70 degrees. The illumination intensity increases from the optical axis (0 degree) toward the two opposite sides and reaches the maximum values of +60 degrees and −60 degrees respectively, and then decreases from the maximum values.

Figure 8:
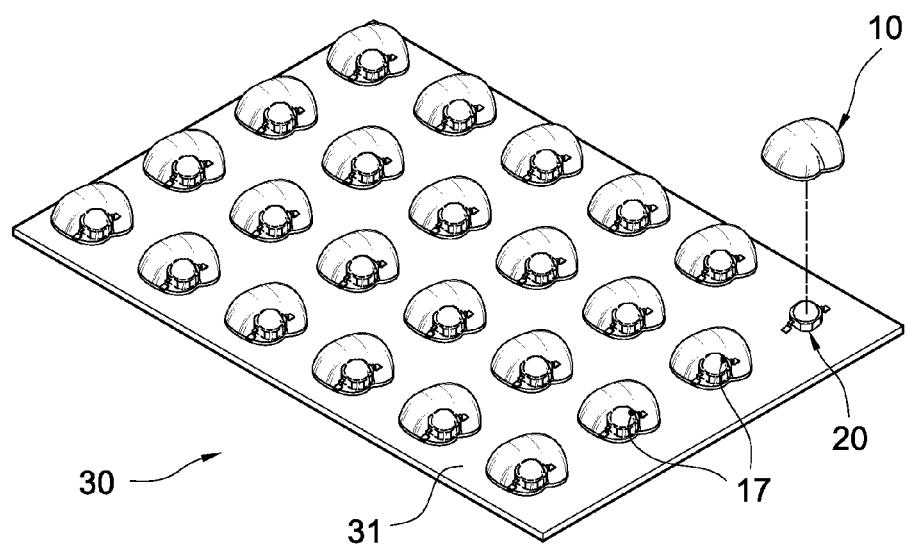
FIG. 8 is a schematic view of the lighting module of the present invention.

FIG. 8 is a schematic view of the lighting module 30 according to an embodiment of the present invention. The lighting module 30 includes a printed circuit board (PCB) 31, a plurality of LEDs 20, and a plurality of optical lenses 10. The LEDs 20 are arranged on the PCB 31 and electrical connected to the PCB 31. The optical lenses 10 are arranged on the LEDs 20, respectively. Each of the negative lens portions 17 used for diverging light is arranged toward a same direction, which can be defined as a diverging direction. In this embodiment, the LEDs 20 and the optical lenses 10 on the PCB 31 are arranged in a 4×6 matrix. In the practical application, the matrix size can be 1×6, 2×6 or 3×6. However, the number of the optical lenses 10 and the LEDs 20 can be adjusted based on the different situations.

Figure 9:
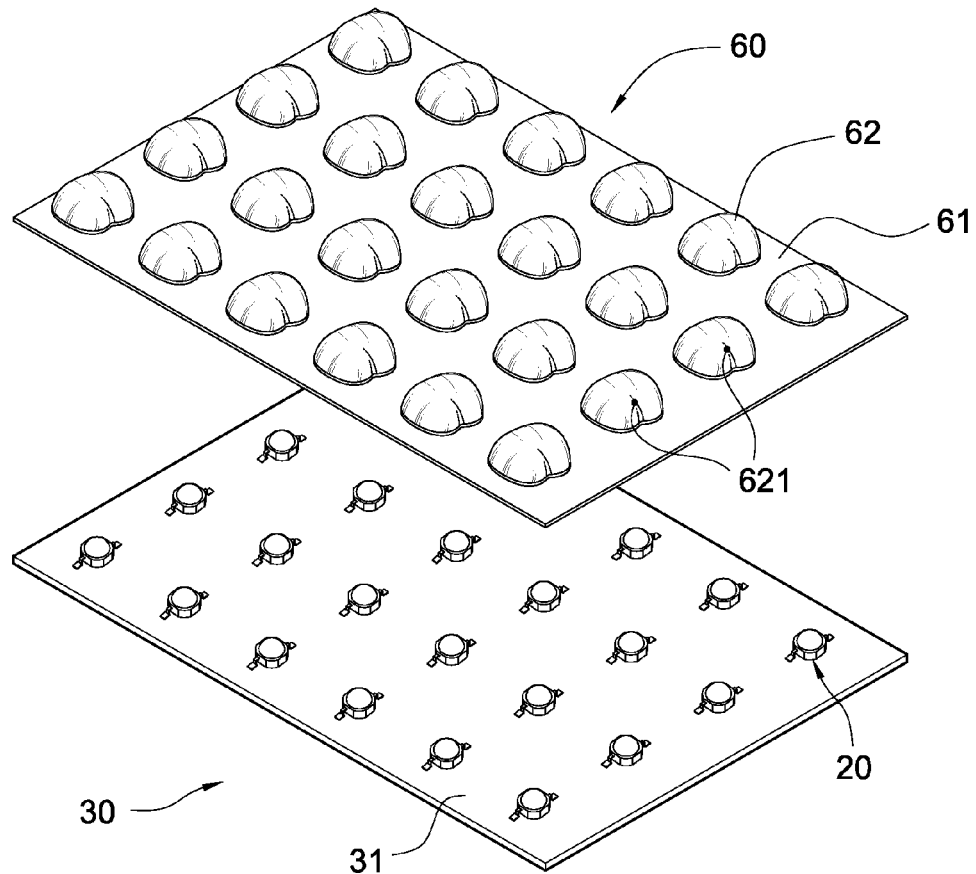
FIG. 9 is a schematic view of the lighting module of the present invention.

The optical lenses 10 can be connected into an array. As shown in FIG. 9, a one-piece formed optical lens array 60 includes a connecting frame 61 and a plurality of optical lenses 62 arranged on the connecting frame 61. Instead of being shown in FIG. 9, the connecting frame 61 can be constituted by a plurality of independent connecting strips. In the practical application, the connecting frame 61 can be omitted and the optical lenses 62 can be directly inter-connected to each other to constitute the optical lens array 60. The optical lens array 60 formed in this manner not only is easier to be manufactured, but also reduces the assembling time while the optical lens array 60 is being arranged on the LEDs 20.

Figure 10:
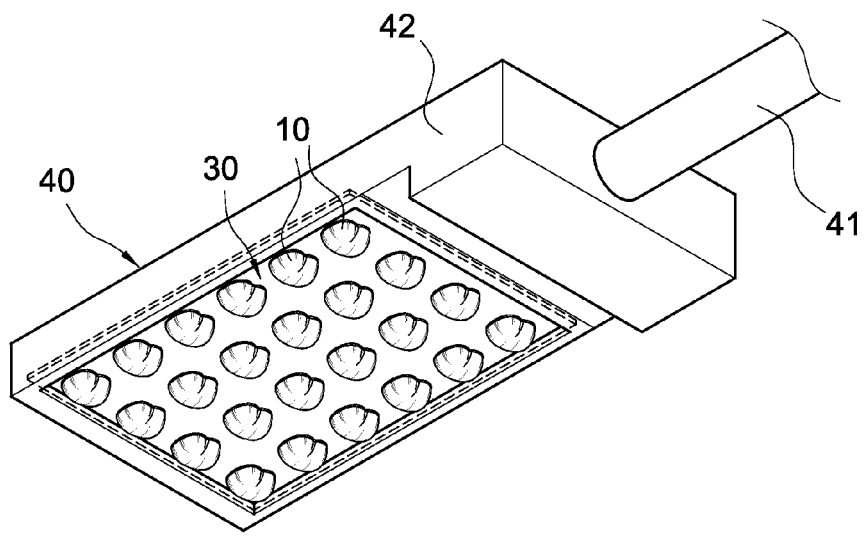
FIG. 10 is a schematic view of the street lamp of the present invention.

FIG. 10 is a schematic view of the street lamp of the present invention. The street lamp 40 can be used to illuminate the road surface. The street lamp 40 includes a lamp post 41, a lamp holder 42 and a lighting module 30. The lamp holder 42 is connected to the lamp post 41. The lighting module 30 is mounted in the lamp holder 42 and illuminates downwardly. The above-mentioned diverging direction of the lighting module 30 is toward the lamp post 41.

Figure 11:
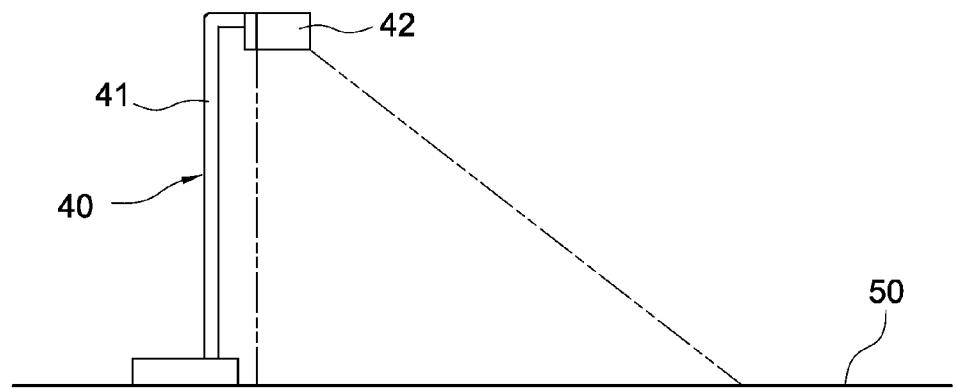
FIG. 11 is a schematic view of the street lamp.
Figure 12:
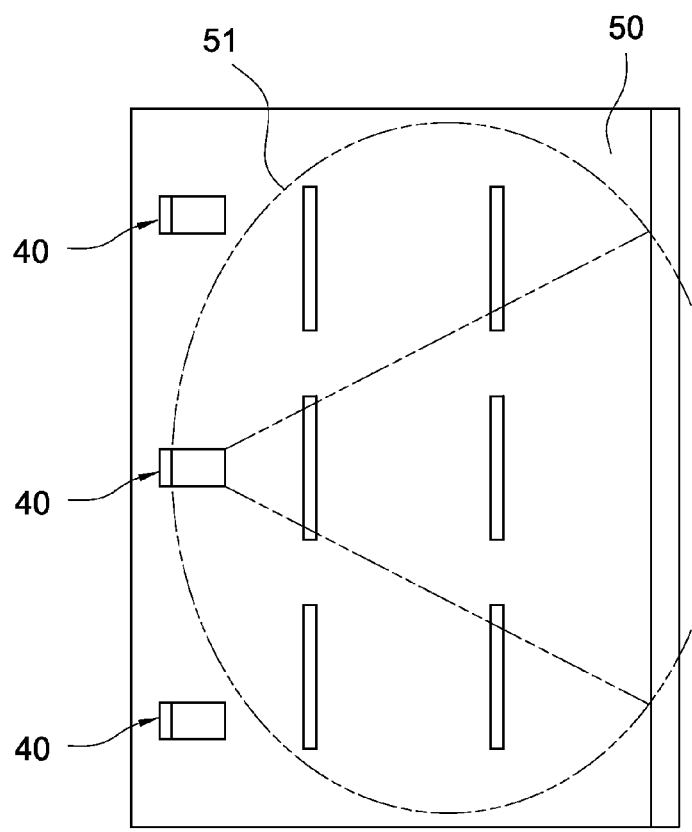
FIG. 12 is another schematic of top view of the street lamp.

As FIG. 11 shows, the lamp holder 42 horizontally extends from the lamp post 41 for illuminating the road surface 50, which meets the standard of street lamp. The horizontally extending lamp holder 42 can decrease the possibility that the LEDs in the lamp holder 42 are directly viewed by the human eye thus cause discomfort and blurred vision, and thus can effectively prevent traffic accidents. In another aspect, since the diverging direction is opposite to the road surface 50 and the lighting module 30 is mounted parallel to the road surface 50, the light can be prevented from directly irradiating into human eye. The discomfort or blurred vision can be avoided. FIG. 12 is a schematic top view of the street lamp 40. In conclusion, although the lamp holder 42 horizontally extends from the lamp post 41 toward the road surface 50, the street lamp 40 can still efficiently illuminate the road surface 50 in an inclined direction. The street lamp 40 can at least illuminate three lanes of the road surface 50 and provides uniform illuminating distribution.

While the invention has been described by means of specific embodiments, numerous modifications and variations could be made thereto by those skilled in the art without departing from the scope and spirit of the invention set forth in the claims.

What is claimed is:

1. An optical lens, comprising:
   a main body, having an outer convex surface and a bottom surface opposite to the outer convex surface, the bottom surface having an inner concave surface concave toward the outer convex surface,
   wherein the outer convex surface and the inner concave surface cooperatively form two positive lens portions and a negative lens portion, the positive lens portions and the negative lens portion arranged in a triangular configuration,
   wherein the outer convex surface and the inner concave surface each have a varying curvature and each have a portion of its surface having largest curvature with each of said portions forming a bulged portion and the direction of the bulge of the portion having the largest curvature of the outer convex surface faces away from the direction of the bulge of the portion having the largest curvature of the inner concave surface.

2. The optical lens in claim 1, wherein the distances between the negative lens portion and each of the positive lens portions are equal.

3. The optical lens in claim 1, wherein the largest curvature of the outer convex surface is larger than the curvature of the portion of the inner concave surface which is most adjacent to the portion having the largest curvature of the outer convex surface, and the largest curvature of the inner concave surface is larger than the curvature of the portion of the outer convex surface which is most adjacent to the portion having the largest curvature of the inner concave surface.

* * * * *